A. H. GRUBER.
REINFORCING FOR TIRE CASINGS.
APPLICATION FILED AUG. 27, 1918.
1,306,334.
Patented June 10, 1919.
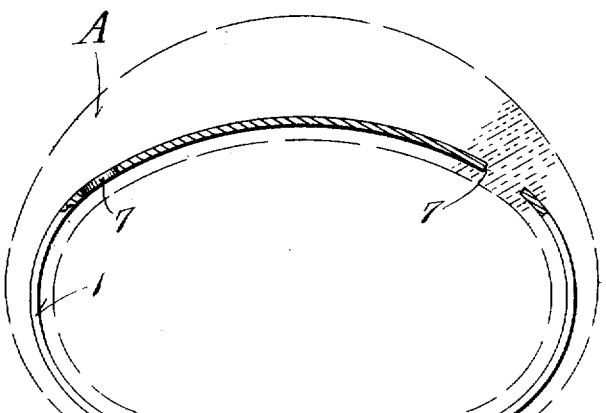
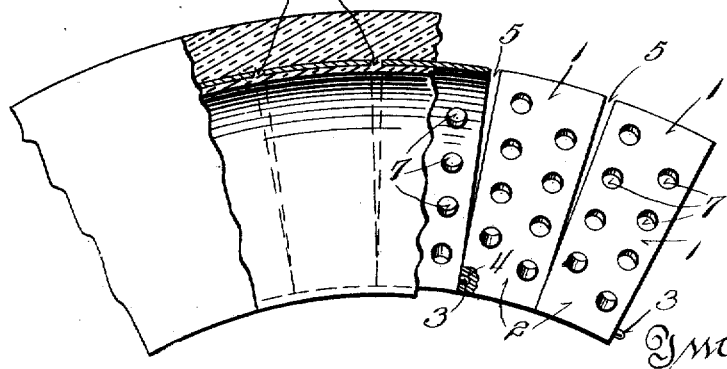
Inventor
Arthur H. Gruber

UNITED STATES PATENT OFFICE.

ARTHUR H. GRUBER, OF EVANSTON, ILLINOIS.

REINFORCING FOR TIRE-CASINGS.

1,306,334.                Specification of Letters Patent.    Patented June 10, 1919.

Application filed August 27, 1918.   Serial No. 251,602.

*To all whom it may concern:*

Be it known that I, ARTHUR H. GRUBER, a citizen of the United States, and resident of Evanston, in the county of Cook and State of Illinois, have invented certain new and useful Improvements in Reinforcings for Tire-Casings; and I do hereby declare that the following is a full, clear, and exact description thereof.

My invention refers broadly to improvements in automobile tire casings, and more specifically to reinforcing members therefor.

It is in general an object of this invention to improve upon the structure illustrated in my co-pending patent application filed Mar. 30, 1917, Serial No. 158,520. In that application a pneumatic tire reinforcing member is shown, the same consisting of a plurality of substantially U-shaped plates disposed edge to edge in abutting relation.

It has been found that particularly in tires of the "straight-side" type the free end portions of certain of the plates tend to move relative to the similar portions of the adjacent plates. Therefore, it is more specifically an object of the invention to provide means for interlocking the free end portions of the several plates to hold the same in alinement.

A further object is to construct a tire of a more resilient nature than that illustrated in said pending application. I accomplish such by pivoting the several reinforcing plates together at their inner ends, the tread portions being normally spaced apart and free to move toward and away from each other as the other portions of the tire give in passing over irregular surfaces.

With these and other objects in view the invention resides in the novel features of construction, combination and arrangement of parts, which will be hereinafter more particularly described, and claimed and shown in the drawing wherein:

Figure 1 represents an edge view of one of a plurality of metallic reinforcing plates, which are adapted to be embedded in a tire casing, said casing being indicated in this figure by the broken lines, and Fig. 2 is a side elevational view of a number of reinforcing plates disposed edge to edge in abutting relation, parts of said plates being broken away to more clearly illustrate the construction thereof, and Fig. 3 is an elevational view of a modified form of reinforcing plate.

Referring more specifically to the figures of the accompanying drawing, it will be seen that the numeral 1 indicates one of a plurality of substantially U-shaped metallic reinforcing plates constructed very similar to the plates illustrated in the drawing of the above mentioned co-pending application, these plates also being adapted to be embedded in, or to form the foundation of, a pneumatic tire casing A.

The tread portions of the plates, and in fact substantially all parts thereof with the exception of the free end portions 2, are relatively thin so that they will be flexible. The free end portions 2 are materially thickened in transverse cross section, since it is at these points that the strain of holding the casing upon a rim is greatest. When the plates 1 are used in "straight-side" tires, the outer surfaces of these thickened portions 2 are relatively flat and without the usual attaching beads. For this reason it is necessary in such tires to supply the plates 1 with means for interlocking the thickened portions 2 together to retain them in alinement, or in other words to prevent the ends of one plate from moving independently of those of the others. This interlocking engagement of the free end portions of the plates 1 is carried out in a simple, efficient, and inexpensive manner by providing round tenons or pins 3 for coöperative engagement with the sockets 4. From Fig. 2 it will be noted that each of the plates carries a pair of pins which project from one side of the thickened portions, while in the other side of said portions, the sockets 4 are formed. Thus each plate forms a unit of a continuous reinforcing member, all parts of which are interlocked with each other.

As hereinbefore mentioned a more efficient tire structure may be formed by permitting circumferential movement of the outer or tread portions of the reinforcing plates, while at the same time holding the free end portions interlocked as above set forth. In other words in side elevation each of the plates is substantially the same width from its free end portion 2 to its tread portion, and thus when the plates are disposed radially said tread portions will be spaced apart as at 5. The connection between the pins and sockets 3 and 4 respectively is sufficiently loose to permit the edges of said tread portions to move toward and away from each other.

The spaces 5 between said reinforcing plates also permits the rubber forming the tire A to be vulcanized therebetween as shown at 6 of Fig. 2. This tends to prevent the rubber and fabric portion of the tire from slipping or moving with respect to said plates. Such movement is further prevented by the plurality of holes 7 formed in said plates through which the rubber is vulcanized.

Any other preferred means might obviously by used for connecting the free end portions 2 of the several plates together, therefore I do not wish to be limited to the use of the pins and sockets illustrated. In other words various changes may be made in the form and proportion of the several parts of the invention, without departing from or sacrificing any of the principles thereof.

In some instances, especially where a tire is subjected to heavy work, it may be desired to use a reinforcing plate provided with corrugations 1' as shown in Fig. 3. This will not only allow for expansion and contraction of the reinforcing plate which is caused by the tire becoming heated, but, will further add resiliency to the plate thereby eliminating crystallization and crumbling of the same which might result under heavy strain were the reinforcing plates formed as shown in Fig. 1.

I claim:—

1. A reinforcing means for tire casings comprising a plurality of substantially U-shaped plates adapted to be embedded in a casing, said plates having their end portions disposed edge to edge, one end portion of each plate having a socket in one edge, a projection extending from the other edge of each of the last mentioned end portions to engage in said sockets, and means for securing the other free end portions of the plates together.

2. A reinforcing means for tire casings comprising a plurality of substantially U-shaped corrugated resilient plates adapted to be embedded in a casing, said plates having their free end portions disposed edge to edge, each end portion of each plate having a socket in one edge, and a projection extending from the other edge of each of the end portions to engage in the adjacent sockets.

In testimony that I claim the foregoing I have hereunto set my hand at Milwaukee, in the county of Milwaukee and State of Wisconsin.

ARTHUR H. GRUBER.

Copies of this patent may be obtained for five cents each, by addressing the "Commissioner of Patents, Washington, D. C."